United States Patent
Cosenza et al.

(10) Patent No.: US 7,377,735 B2
(45) Date of Patent: May 27, 2008

(54) SNAP ON RETAINING RING WITH ENHANCED TAB THICKNESS

(75) Inventors: Frank J. Cosenza, Santa Barbara, CA (US); Luke L. Haylock, Culver City, CA (US)

(73) Assignee: Alcoa Global Fasteners, Inc., Torrance, CA (US)

( * ) Notice: Subject to any disclaimer, the term of this patent is extended or adjusted under 35 U.S.C. 154(b) by 0 days.

(21) Appl. No.: 11/087,834

(22) Filed: Mar. 23, 2005

(65) Prior Publication Data

US 2006/0216133 A1  Sep. 28, 2006

(51) Int. Cl.
  *F16B 21/18* (2006.01)
(52) U.S. Cl. .................. 411/517; 411/521; 411/353
(58) Field of Classification Search .............. 411/353, 411/516, 517, 521, 526, 970, 999; 403/375
  See application file for complete search history.

(56) References Cited

U.S. PATENT DOCUMENTS

| 707,785 | A | | 8/1902 | Kleber | |
|---|---|---|---|---|---|
| 2,400,166 | A | | 5/1946 | Reece | |
| 2,451,747 | A | | 10/1948 | Kindt | |
| 3,180,388 | A | * | 4/1965 | Newcomer, Jr. et al. | .... 411/353 |
| 3,294,140 | A | | 12/1966 | Cosenza | |
| 3,995,675 | A | | 12/1976 | Cosenza | ....................... 151/69 |
| 4,069,855 | A | | 1/1978 | Petroshanoff | ................. 151/69 |
| 4,464,090 | A | | 8/1984 | Duran | ........................ 411/103 |
| 4,844,677 | A | | 7/1989 | Schwartzman | ............... 411/512 |
| 4,854,795 | A | | 8/1989 | Duran | ........................ 411/352 |
| 4,911,726 | A | * | 3/1990 | Warkentin | ................. 81/124.2 |
| 4,963,063 | A | * | 10/1990 | Gulistan | ..................... 411/105 |
| 5,056,208 | A | * | 10/1991 | Stafford | ........................ 29/515 |
| 5,399,053 | A | * | 3/1995 | Duran | ........................ 411/353 |
| 5,509,752 | A | | 4/1996 | Kocisek | ..................... 403/373 |
| 5,598,994 | A | * | 2/1997 | Olewinski et al. | ............ 248/73 |
| 6,619,898 | B1 | | 9/2003 | Cosenza | ..................... 411/353 |
| 6,682,282 | B2 | * | 1/2004 | Allen | ......................... 411/353 |

* cited by examiner

*Primary Examiner*—Flemming Saether
(74) *Attorney, Agent, or Firm*—Greenberg Traurig LLP

(57) ABSTRACT

A retaining ring for use with a fastener is disclosed. The retaining ring comprises a plurality of substantially t-shaped internal tabs that oppose one another and are about twice as thick as the exterior of the ring. The ring is installed onto a fastener having at least two longitudinally-oriented slots by locating a tab into one of the slots and snapping another tab into another slot, thereby momentarily elongating during installation. The tabs substantially reduce the possibility of accidental removal of the retaining ring. In addition, resistance and damage to the internal tabs of the retaining ring is substantially reduced when the retaining ring slides axially in the longitudinal slots of the fastener. Since only the longitudinally-oriented slots are required for installation, the axially-oriented entry slots and cross-over slots of some fastener embodiments can be eliminated, thereby significantly reducing fastener cost and manufacturing time.

4 Claims, 5 Drawing Sheets

SNAP ON RETAINING RING WITH ENHANCED TAB THICKNESS

FIELD OF THE INVENTION

The present invention relates generally to retaining rings, and more particularly, retaining rings for use on panel fasteners.

BACKGROUND OF THE INVENTION

The current fastener utilizes longitudinal slots that extend from underneath the fastener head to almost the opposite end of the fastener. There are at least two longitudinal slots per fastener. The location of these longitudinal slots extend through the non-threaded "grip" or "shank" portion and also the threaded segment of the fastener. The length of the longitudinal slots terminate a short distance from the fastener's end and allow a ledge of material to be present. At a prescribed angle from the longitudinal slots are located two other axial slots; these slots are called "entry slots" for the installation of the retaining ring. These axial "entry slots" are considerably shorter in length as compared to longitudinal slots. At the termination of the entry slots, they are joined with another slot that connects the entry slot with the much longer longitudinal slots. This "cross over" slot is normal to the entry slots and the longer longitudinal slots.

Upon installation, the fastener is placed through a mating hole in the outer panel. An internally tabbed retaining ring is aligned with the entry slots, and slid a short distance until it reaches the cross over slot. At that junction, the retaining ring is then rotated toward the longitudinal slots. When the retaining ring tabs are in the longitudinal slots, the retaining ring is free to move axially and retain the fastener to the outer panel. The weakness with this design is that the retaining ring, once installed, can be removed almost as easily as it was installed. During normal installations and removals, the retaining ring occasionally catches a retaining ring tab in the cross over slot. When this occurs, the retaining ring may remove itself and the tabs may be damaged and deformed. The thinness of the tabs occasionally cause a slight restriction of movement with the axial walls of the longitudinal slots, especially when the retaining ring is severely angled. Finally, the addition of the entry and cross over slot adds additional manufacturing cost to the fabrication.

The primary object of the present invention is to provide a retaining ring for use with a panel fastener that substantially reduces accidental removal from the longitudinal slots of the fastener.

Another object of the invention is to substantially reduce the accidental removal and hanging up of the retaining ring should it attempt entering the cross over slots of the fastener.

Another object of this invention is to substantially reduce the possibility of resistance and damage to the internal tabs of the retaining ring when the retaining ring slides axially in the longitudinal slots of the fastener.

A further object of this invention is to provide a method of installing the retaining ring to the fastener that only requires longitudinal slots on the fastener, and that does not involve sliding or twisting of the retaining ring.

These and other objects and advantages are met or exceeded by the instant invention, and will become more fully understood and appreciated with reference to the following description.

SUMMARY OF THE INVENTION

The instant invention relates to a retaining ring for use with a panel fastener. The retaining ring comprises substantially t-shaped internal tabs that oppose one another and are about twice as thick as the exterior of the ring. When used on a fastener having longitudinally-oriented slots and axially-oriented entry slots that are interconnected by circumferentially-oriented cross-over slots, the thickness of the tabs substantially prevents the possibility of the tabs from entering the cross-over slots and leaving the fastener. The thickness of the tabs also substantially reduces the possibility of resistance and damage to the internal tabs of the retaining ring when the retaining ring slides axially in the longitudinal slots of the fastener.

The fastener has an enlarged head at one end for engaging the panel and a frusto-conical taper at the opposite end. The taper is set at a controlled depth from the edge of the end at about 0.035-0.040 inches and an angle of about 70°. The retaining ring is installed onto the fastener by locating the tab into one of the longitudinally-oriented slots and snapping the other tab into another longitudinally-oriented slot, thereby momentarily elongating the retaining ring during installation. Since only the longitudinally-oriented slots are required for installation, the axially-oriented entry slots and cross-over slots of the fastener can be eliminated, thereby significantly reducing fastener cost and manufacturing time.

DETAILED DESCRIPTION OF PREFERRED EMBODIMENTS

Figure 1:
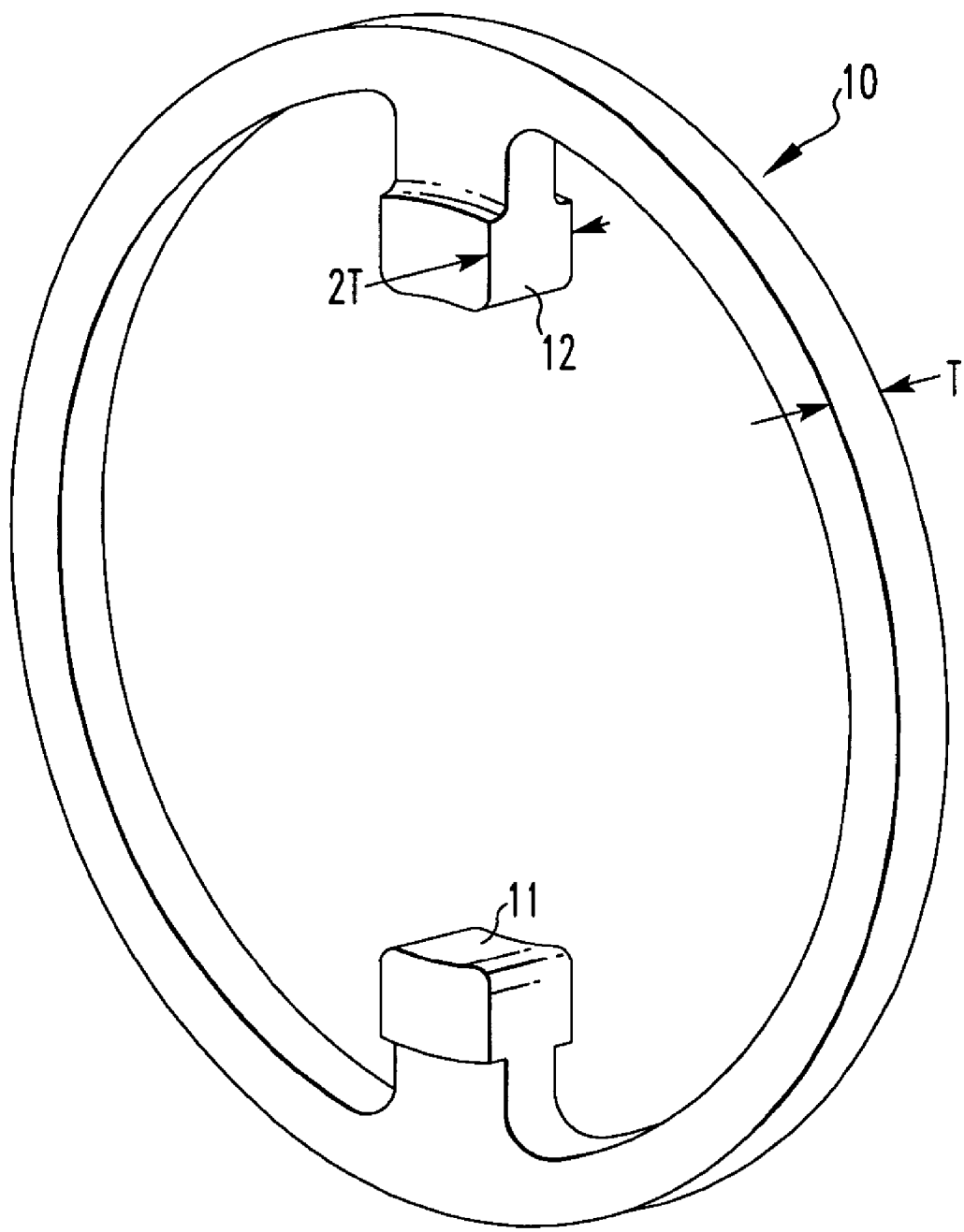
FIG. 1 is a perspective view of the retaining ring of this invention.
Figure 2:
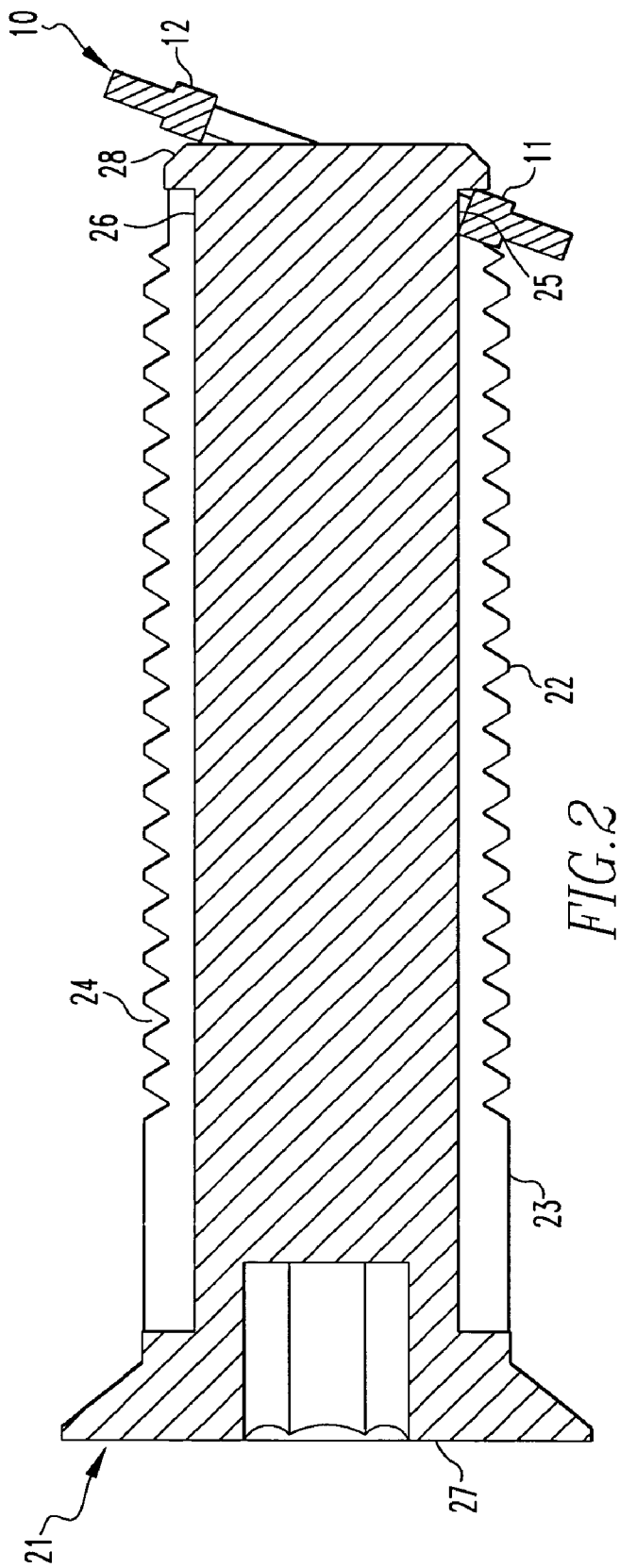
FIG. 2 is a cross-sectional view showing installation of the retaining ring to the fastener.

FIG. 1 is a perspective view of the retaining ring 10 of the invention. The ring 10 is generally flat and can be of any shape, but is preferably circular shaped. The ring 10 is preferably, though not necessarily, made from a thin, flexible metal. For the purposes of this invention heat-treated stainless steel is used. The inside diameter of the ring 10 provides enough clearance so as not to come into contact with the threads (FIG. 2, 22) on the fastener shaft (FIG. 2, 23). To facilitate engagement with the fastener (FIG. 2, 21), the ring 10 comprises a plurality of substantially t-shaped, internally projecting tabs 11,12 that oppose each other. The exterior of the ring and the tabs can be of the same thickness, however for the purposes of this invention, the tabs 11,12 are preferably about twice 2T as thick as the exterior T of the ring 10. The thickness of the exterior of the ring is about 0.025-0.030 inches. In addition, the tabs are preferably t-shaped, but could be of any shape that would make the tabs about twice as thick as the exterior of the ring.

Figure 3:
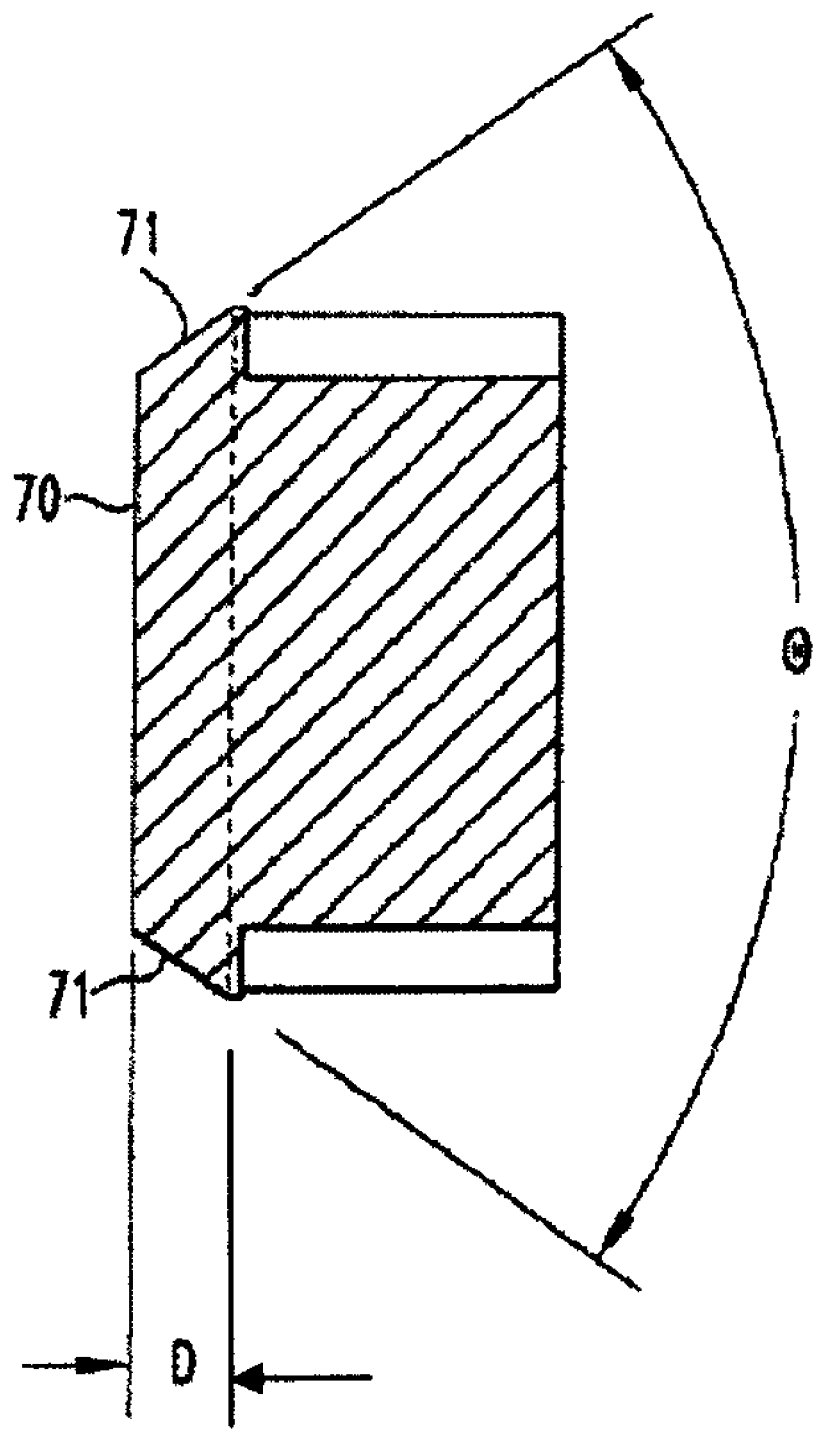
FIG. 3 is a cross-sectional view showing the frusto-conical tapered end of the fastener.

FIG. 2 is a cross-sectional view showing installation of the retaining ring 10 to the fastener 21. The fastener 21 includes an elongated shaft 23 having an exterior surface 24 defining threads 22 with an enlarged head at one end 27 for engaging a panel and a frusto-conical taper at the opposite end 28. FIG. 3 shows the frusto-conical tapered end 70 of the fastener. The taper 71 is set at a controlled depth D from the edge of the end 70 at about 0.035-0.040 inches and at an angle θ of about 70°. Having the end 70 tapered at this angle allows for easier installation of the retaining ring. Also present in FIG. 2 are at least two longitudinally-oriented slots 25, 26 having closed ends that do not extend to or open into the end 28 of the shaft 23. In accordance with the invention, the depth of the closed-ended slots 25, 26 are selected to accommodate the passage of the retaining ring tabs 11, 12 when the ring is being secured to the fastener 21. To install the retaining ring 10 on the fastener 21, a tab 11 is located into one of the longitudinally-oriented slots 25 of the fastener 21 and the opposing tab 12 is momentarily elongated and snapped into another longitudinally-oriented slot 26 of the fastener 21. The method of installing does not require twisting or sliding of the retaining ring 10, thus substantially reducing the possibility of damage to the retaining ring 10 and tabs 11,12 and allowing for easier installation of the retaining ring 10. After installing the ring 10 into the slots 25, 26, the ring 10 is pushed upwardly until the tabs 11, 12 are stopped by the upper extremity of the slots 25, 26.

Figure 4:
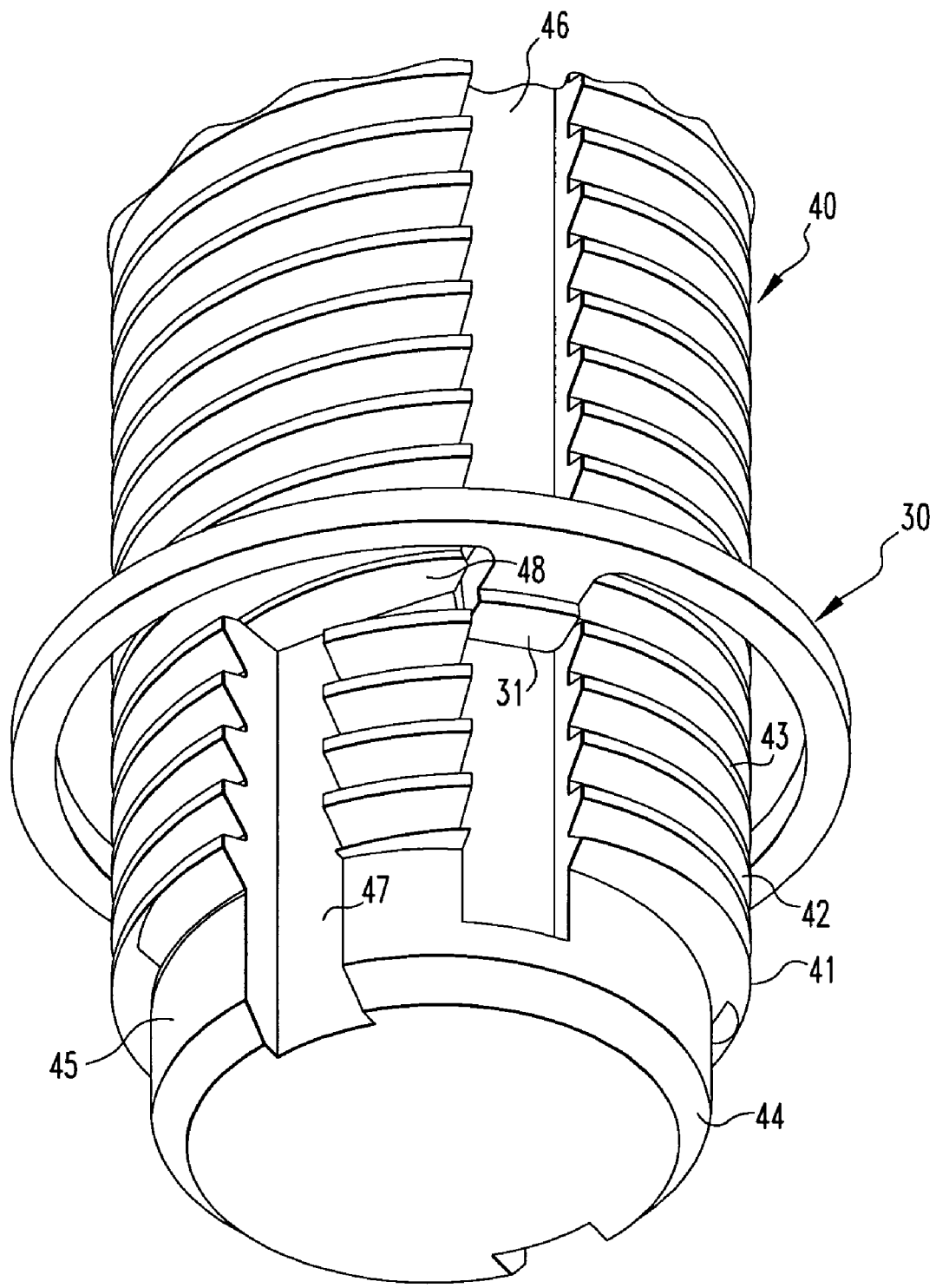
FIG. 4 is a perspective view showing the enhanced tab retaining ring of this invention at the junction of the cross-over slots of the fastener.

FIG. 4 is a perspective view showing the enhanced tab retaining ring 30 at the junction of the cross-over slots 48 of an alternative embodiment of a fastener 40 of the present invention. The fastener 40 includes an elongated shaft 41 having an exterior surface 42 defining threads 43 with an enlarged head at one end (not shown) for engaging a panel and a frusto-conical taper at the opposite end 45. The taper is set at the same angle and depth from the end as the fastener in FIG. 2. The exterior surface 42 also comprises at least two longitudinally oriented slots 46 terminated short of the end 45 of the shaft 41, at least two axially-oriented slots 47 extending to the taper end 45 of the shaft 41 and circumferentially spaced from the longitudinally-oriented slots 46, and at least two circumferentially-oriented crossover slots 48 interconnecting the longitudinally oriented and axially-oriented slots 46, 47. The retaining ring 30 is installed in the same manner as the retaining ring 10 in FIG. 2. Current retaining rings contain tabs that are much thinner than the tabs 31 of the current invention. During normal installations and removals, the retaining ring occasionally catches a retaining ring tab in the crossover slot. When this occurs, the retaining ring may remove itself and the retaining ring tabs may become damaged and deformed. The retaining ring 30 of this invention includes tabs 31 that are about twice as thick as the exterior of the ring 30. These tabs 31 are larger than the width of the cross-over slots 48, thus substantially preventing the possibility of accidental removal of the retaining ring 30 from the fastener 40.

Figure 5:
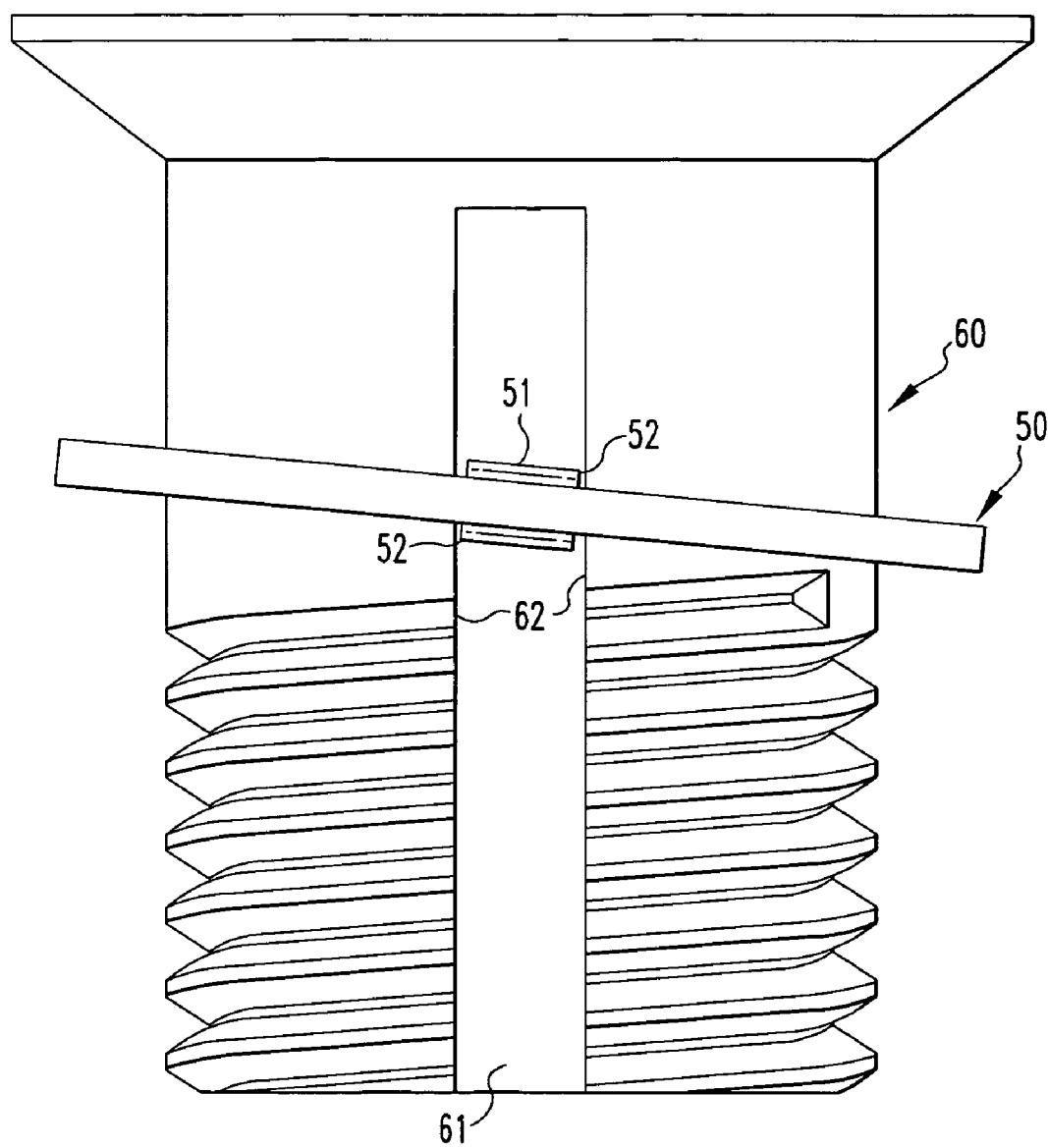
FIG. 5 is a perspective view showing the angle of incidence of the enhanced tab retaining ring of this invention as used on the fastener.

FIG. 5 is a perspective view showing the angle of incidence of the enhanced tab retaining ring 50 of this invention as used on the fastener 60. The angle of incidence is the angle at which the corners 52 of the retaining ring tab 51 hit the walls 62 of the longitudinally-oriented slot 61. The retaining ring 50 is at the maximum angle position. At this angle, current retaining rings experience occasional gouging and retaining ring "hanging up", which causes restriction of free axial movement of the retaining ring. Due to the retaining ring 50 of the current invention having thicker tabs 51, the angle of incidence is less thus assuring freer axial travel.

Having described the presently preferred embodiments, it is to be understood that the invention may be otherwise embodied within the scope of the appended claims.

What is claimed is:

1. The fastener assembly comprising:
a fastener including an elongated shaft having an exterior surface defining at least two longitudinally-oriented slots terminated short of the end of said shaft, at least two axially-oriented slots extending to the end of said shaft and circumferentially spaced from said longitudinally-oriented slots, said end of said fastener having a taper at an angle of about 70° and a depth of about 0.035-0.040 inches from said end;
a continuous retaining ring having a main body and a plurality of substantially t-shaped internal tabs, said tabs are about twice as thick as the exterior of said main body of said ring and adapted to snap onto said elongated shaft, with the tabs projecting into said slots, the thickness of the tabs providing freer axial travel through the longitudinally-oriented slots of the fastener and preventing the retaining ring from being damaged by gouging during installation; and
at least two circumferentially-oriented cross-over slots interconnecting said longitudinally-oriented and said axially-oriented slots;
wherein said tabs are wider than said crossover slots substantially reducing the possibility of said tabs from entering said crossover slots.

2. The fastener assembly of claim 1 wherein said t-shaped internal tabs oppose one another.

3. The fastener assembly of claim 1 wherein said ring comprises metal.

4. The fastener assembly of claim 3 wherein said metal comprises heat-treated stainless steel.

* * * * *